July 4, 1950          W. DZUS          2,513,553
FASTENING DEVICE
Filed Sept. 18, 1946
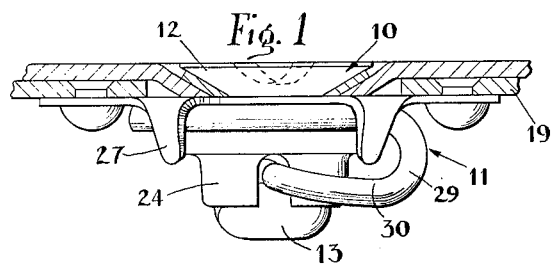
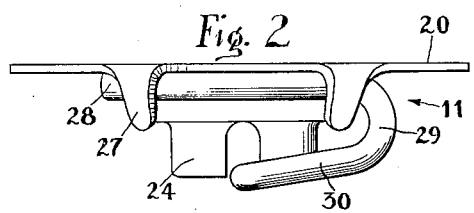
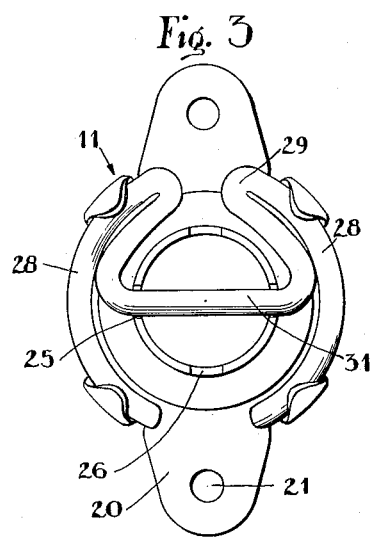
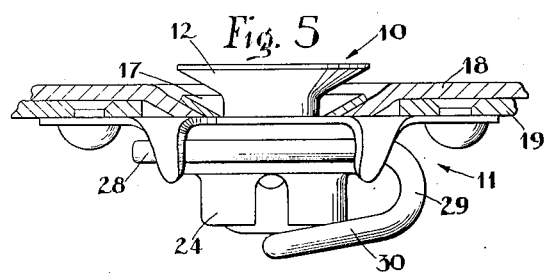
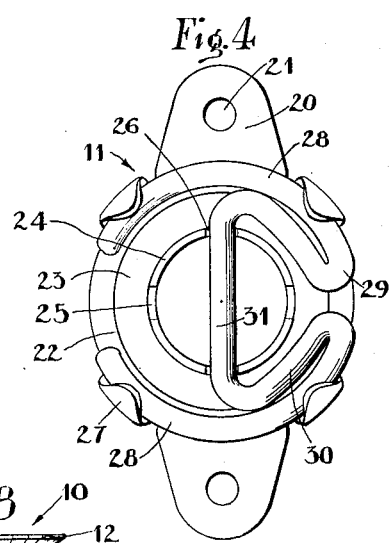
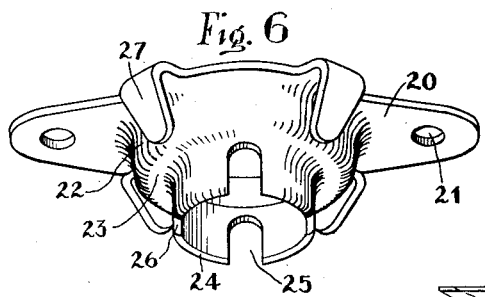
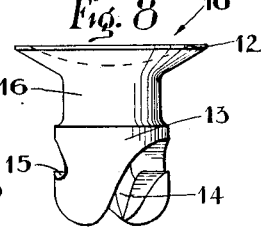
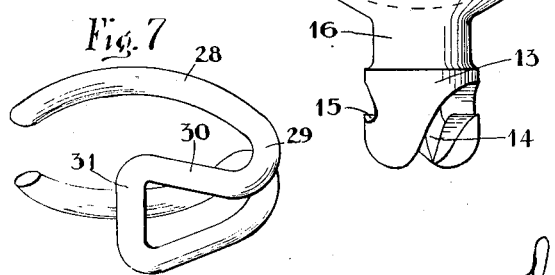
INVENTOR
William Dzus
Daniel H. Kane
ATTORNEY Patented July 4, 1950

2,513,553

UNITED STATES PATENT OFFICE 2,513,553

FASTENING DEVICE

William Dzus, West Islip, N. Y.

Application September 18, 1946, Serial No. 697,753

1 Claim. (Cl. 24—221)

This invention relates to an improved fastening device of the quick-acting, self-locking type.

Fasteners of the quick-acting, self-locking type generally consist of a stud member and also of a spring or receptacle member which are interengageable upon the rotation of one with respect to the other. This invention has particular relation to the spring or receptacle member and it is an object of the invention to provide an improved receptacle member which presents the following advantages:

First: It is relatively simple and inexpensive to manufacture and install;

Second: It is readily interchangeable with existing springs and receptacle;

Third: The spring is designed so as to distribute the bending or flexing thereof over a relatively large area thereby prolonging the life thereof;

Fourth: The spring portion of the receptacle, which carries the direct impact of the wear and load, can be readily removed and replaced by a new spring;

Fifth: The angle of the spring portion, with respect to the supporting shell of the receptacle, may be readily changed so as to vary the angle of engagement between the stud and receptacle;

Sixth: The receptacle has high strength characteristics in both tension and shear and is vibration proof; and Seventh: The receptacle is so designed that when the stud is unlocked, the spring portion serves to eject or partially eject the head of the stud from the plate in which it is mounted.

In the accompanying drawings:

Fig. 1 is a side elevational view of a fastener assembly embodying my invention showing it in locked position;

Fig. 2 is a side elevational view of the receptacle member of the fastener;

Fig. 3 is a bottom plan view of the receptacle showing the spring arranged in one relative position;

Fig. 4 is a similar view showing the spring arranged in another position;

Fig. 5 is a view similar to Fig. 1 with the fastener unlocked and with the stud partially ejected from the plate by the spring;

Fig. 6 is a perspective view of the supporting portion of the receptacle;

Fig. 7 is a perspective view of the spring portion of the receptacle; and

Fig. 8 is a side elevational view of the stud member.

As previously stated, my fastener is of the quick-acting, self-locking type and comprises a stud member 10 and a receptacle member 11 which are interengageable upon the rotation of one member with respect to the other.

The stud member is of the spiral cam type, as shown in my Patent No. 1,955,740, and comprises a head portion 12 and a shank 13, which is preferably tubular at its lower end, and is provided with oppositely disposed, inwardly extending spiral slots 14 terminating in shoulders or detents 15 which serve to hold the cross bar of the spring in position when the fastener is locked. The shank of the stud is preferably provided with a grooved portion 16 of reduced diameter immediately beneath the head, which cooperates with a grommet 17 in a well-known manner so as to hold the stud in position in a dimpled aperture formed in the plate 18. The stud is free to rotate, but is held by the grommet, against detachment from the plate.

The stud member and associated parts heretofore described are of well-known conventional design and construction. My invention resides in the receptacle member 11 which is attached to the plate 19. The receptacle member comprises a supporting portion, which is shown separately in Fig. 6, and a spring portion which is detachably applied thereto, and which is separately shown in Fig. 7. The supporting portion is preferably formed from sheet or strip metal and comprises an elongated mounting plate 20 having apertures 21 for rivets or the like adjacent opposite ends thereof. The center portion of the mounting plate is somewhat wider than the end portions, and drawn or spun from the center thereof is a tubular shell consisting of a base portion 22 of somewhat larger diameter connected by means of an inwardly extending shoulder 23 to the outer portion 24 of reduced diameter. The two portions of the shell are concentric, as shown, and the diameter of both portions is sufficient to accommodate the shank of stud 10. The outer portion of the shell is provided with two pairs of slots 25 and 26, the slots 25 being formed in the diameter which is disposed transversely of the receptacle and the slots 26 being disposed on the diameter which extends longitudinally of the receptacle. The slots extend inwardly from the outer end of the shell to the shoulder 23 so that the shoulder as well as the base of the slots serve as supports for the cross arm of the spring as will be later explained.

Evenly spaced around the enlarged center portion of the supporting member and disposed in circular arrangement are four lugs or prongs 27 which serve to hold the spring portion in position as hereinafter described. The prongs are formed integrally with the supporting member and the free ends thereof are curved slightly inwardly.

The spring portion is preferably formed from spring wire, such as hard-drawn steel wire, and consists of a pair of supporting arms 28 of arcuate configuration and arranged to form the opposite segments or arcs of the same circle. The circle defined by the spring arms 28 is slightly larger than the circle defined by the prongs 27. One end of the supporting arms 28 is integrally connected by return bends or loops 29 to the cantilever spring arms 30, which in turn, are connected integrally with opposite ends of the cross bar 31. The cantilever spring arms 30 diverge from each other in the manner shown so that they embrace half of the outer portion of the shell and cross bar or locking bar 31 is disposed across the diameter of the shell.

The spring portion is assembled with the supporting portion by compressing the supporting arms 28 and inserting them inside the prongs 27 until they rest against the mounting plate immediately surrounding the tubular shell. When the compressive force is released from the supporting arms, they will remain in partially compressed position in stressed engagement with the prongs 27 due to the fact that they define a circle of slightly larger diameter than the circle defined by prongs 27, and since the prongs curve inwardly, as shown, the spring will be frictionally held in position. The height of the spring is such that when it is assembled with the supporting portion, the locking bar 31 will be disposed in one of the pairs of slots 25 or 26, and in this connection, the relative relationship between the spring portion and the supporting portion may be varied so that the cross bar is either disposed in the transverse slots 25, as shown in Fig. 3, or in the longitudinal slots 26, as shown in Fig. 4.

In using the complete receptacle it may be spotwelded, riveted or otherwise attached to the plate or other part 19, which is to be fastened to the plate 18, the part 19 first having been formed with an aperture in registry with the central portion of the receptacle in the usual manner. The plates 18 and 19 are then placed in engagement with each other and the shank of the stud is inserted thru the tubular shell of the receptacle until the locking bar of the spring rests in the entrance portion of the slots 14. When the stud is then rotated thru a quarter turn in a clockwise direction, the camming action of the slots draws the locking bar of the spring upwardly until it is locked behind the shoulders 15, as shown in Fig. 1. When the fastener assembly is in locked position, it is securely held against accidental disengagement and is unaffected by vibration. If an unusual force in tension should be applied to the fastener assembly, the stud member and the receptacle member may separate slightly until the locking bar 31 engages against the base of the slots 25 or 26 and against the shoulder 23. Further flexing of the spring is then prevented and the parts are rigidly held against further separation. To unlock the fastener, the stud is simply rotated through a quarter turn in a counter-clockwise direction.

When the fastener assembly is used in connection with other similar fastener assemblies to hold relatively rigid panels or plates together, the arrangement of the parts is such that the stud member 10 is partially ejected from its mounting plate when it is unlocked as shown in Fig. 5. Thus, it will be seen that the locking bar has been disengaged from the slots 14 and is in engagement with the end of the stud. The tension of the spring forces the head of the stud upwardly. At the same time, the engagement between the supporting arms 28 and the lugs or prongs 27 is such as to permit the spring portion to shift slightly outwardly to the position shown in Fig. 5. This feature presents a decided advantage in that it facilitates the separation or detachment of the plates and also gives a visual indication of when the fastener is unlocked.

It will be appreciated from the foregoing description of the construction and operation of my fastener that it presents many decided advantages. Thus, it is simple and inexpensive to manufacture and assemble. The receptacle is readily interchangeable with springs or receptacles heretofore used. The spring portion is detachable and can be readily replaced by other springs, and its relative position can be varied so that the locking bar extends across any one of a plurality of diameters of the tubular shell. Also, due to the cantilever construction of the spring arms 30 and their connection to the supporting arms 28, by means of return bend loops, the flexing or bending of the spring is distributed over a relatively wide area thereby prolonging the life of the spring.

Modifications may, of course, be made in the illustrated and described embodiment of my invention without departing from the invention as set forth in the accompanying claim.

I claim:

A fastener receptacle comprising a supporting portion and a spring portion, the supporting portion being formed with a base plate and a centrally disposed protruding tubular shell formed with two pairs of diametrically disposed slots at right angles to each other in the upper edge of the shell and the spring portion being formed of spring wire and having a pair of arcuate supporting arms resting on the base plate and arranged in confronting relationship on opposite sides of the tubular shell, said supporting arms being integrally connected at one end to cantilever spring arms extending upwardly and at an angle towards the transverse central axis of the supporting arms and being integrally connected together at that point by a cross bar extending diametrically across the upper portion of the tubular shell and disposed in one pair of slots, said spring portion being releasably mounted on the supporting portion so that it can be shifted to a position in which the cross bar is disposed in the other pair of slots.

WILLIAM DZUS.

REFERENCES CITED

The following references are of record in the file of this patent:

UNITED STATES PATENTS

| Number | Name | Date |
| --- | --- | --- |
| 2,270,403 | Bignell | Jan. 20, 1942 |
| 2,401,057 | Dorgelys | May 28, 1946 |